United States Patent [19]

Boyesen

[11] 4,408,674

[45] Oct. 11, 1983

[54] MOTORCYCLE DRIVE WHEEL SUSPENSION SYSTEM

[75] Inventor: Eyvind Boyesen, Kempton, Pa.

[73] Assignee: Performance Industries, Inc., Kempton, Pa.

[21] Appl. No.: 368,220

[22] Filed: Apr. 14, 1982

Related U.S. Application Data

[63] Continuation-in-part of Ser. No. 351,630, Feb. 23, 1982, which is a continuation-in-part of Ser. No. 269,322, Jun. 1, 1981, abandoned.

[51] Int. Cl.³ .............................................. B62K 25/04
[52] U.S. Cl. ................................... 180/227; 280/284; 267/15 R
[58] Field of Search ................ 180/227, 219; 280/283, 280/284, 285; 267/15 R, 15 A

[56] References Cited

U.S. PATENT DOCUMENTS

| | | | |
|---|---|---|---|
| 3,917,313 | 11/1975 | Smith et al. | 280/284 |
| 4,058,181 | 11/1977 | Buell | 180/227 |
| 4,114,918 | 9/1978 | Lutz | 280/284 |
| 4,265,329 | 5/1981 | de Cortanze | 180/219 |

Primary Examiner—John A. Pekar
Attorney, Agent, or Firm—John T. Synnestvedt; Kenneth P. Synnestvedt

[57] ABSTRACT

A suspension system for the drive wheel of a motorcycle driven by a chain cooperating with sprockets on the engine and wheel shafts. The suspension system comprises a parallelogram linkage arrangement associated with the swing arm, with the linkage parts positioned in the region between the wheel and the motor.

7 Claims, 7 Drawing Figures

MOTORCYCLE DRIVE WHEEL SUSPENSION SYSTEM

CROSS REFERENCE

The present application is a continuation-in-part of my application Ser. No. 351,630, filed Feb. 23, 1982, which is a continuation-in-part of my prior application Ser. No. 269,322, filed June 1, 1981, now abandoned.

BACKGROUND AND STATEMENT OF OBJECTS

This invention relates to a drive wheel suspension system for a motorcycle of the kind in which the drive wheel is driven by a chain cooperating with sprockets provided on the engine shaft and on the wheel shaft. In such motorcycles, it has been common practice to employ a swing arm for mounting the wheel, the swing arm having a pivot usually located in the region between the engine sprocket and the periphery of the driven wheel. With this configuration, the motion of the swing arm, which accompanies deflection of the wheel, results in change in the length of the path to be followed by the drive chain interconnecting the engine and wheel sprockets; and a chain slack take up device is commonly employed in order to maintain proper driving engagement of the chain with the sprockets.

It has also been known (see for example U.S. Pat. No. 4,058,181) to provide a parallelogram type of linkage for mounting the drive wheel, this linkage, in effect, comprising multiple swing arms which are interconnected and arranged to provide for pivotal motion of the drive wheel about the axis of the engine sprocket, thereby eliminating the change in the length of the chain path. Although this makes possible elimination of the chain slack take up device, the prior art arrangement has a number of disadvantages, notably the fact that the multiple swing arm elements required for the parallelogram linkage extensively increase the mass of the parts which must move with the wheel.

According to the present invention, provision is made for a parallelogram linkage adapted to be associated with the inner or pivoted end of the swing arm in a region between the periphery of the wheel and the axis of the engine sprocket, but arranged to provide an effective swing arm axis which is coincident with the axis of the engine sprocket. By locating the linkage parts in the region between the periphery of the wheel and the axis of the engine sprocket, the weight of the parts involved is concentrated relatively close to the effective axis of swing motion. This greatly reduces the overall weight of the parts and also reduces the inertia of the parts moving with the wheel and, consequently, improves the responsiveness of the wheel under various operating conditions including, for example, travel over rough terrain such as is commonly encountered in motocross racing.

The invention also contemplates association of the deflection resisting mechanism, such as a typical shock absorbing or shock strut device, with the parallelogram linkage parts located close to the effective swing motion axis, these parts being arranged to provide a reaction point on the frame of the motorcycle which is relatively close to the overall center of gravity of the motorcycle, thereby minimizing tendency for the action of the shock strut to cause the attitude of the motorcycle as a whole to change in consequence of substantial wheel deflection.

BRIEF DESCRIPTION OF THE DRAWINGS

How the foregoing and other objects and advantages are attained will be clear from the following description referring to the accompanying drawings, in which:

FIG. 5 is a partial vertical sectional view of certain parts, taken generally as indicated by the section line 5—5 on FIG. 3;

FIG. 6 is a plan view of certain parts taken in general in the manner indicated by the line 6—6 on FIG. 3.

DETAILED DESCRIPTION OF THE DRAWINGS

Figure 1:
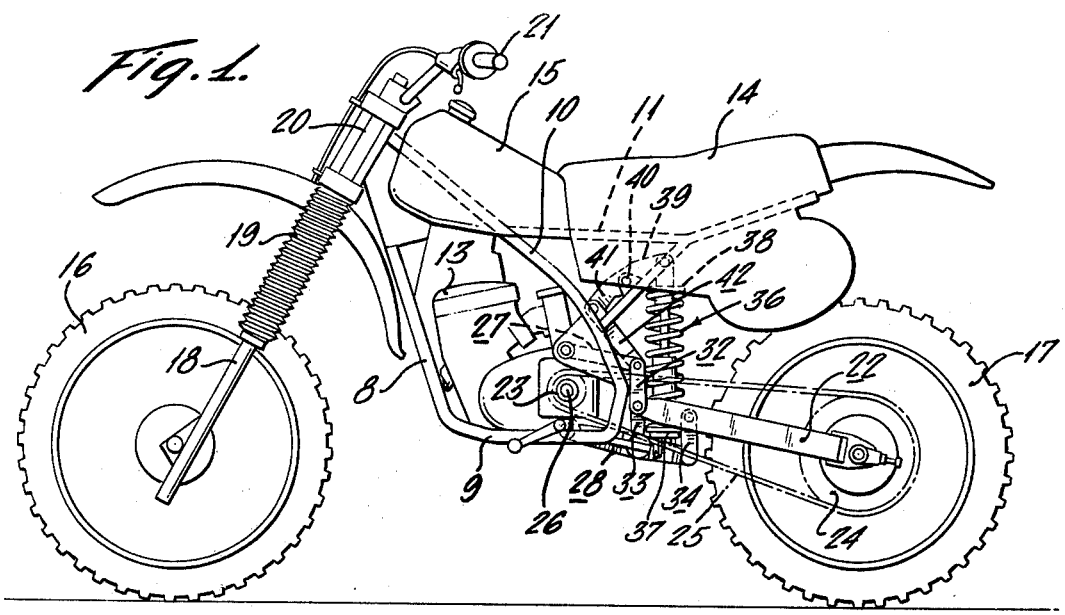
FIG. 1 is an overall side elevational view of a motorcycle equipped with the drive wheel suspension of the present invention.

The motorcycle illustrated in the drawings is typical of motorcycles employed for motocross racing; and while the invention is applicable to vehicles of a variety of types, the arrangement of the invention is particularly desirable for motorcycles, and especially for motorcycles used for motocross racing. The invention is, therefore, illustrated and described in relation to such specific use.

The motorcycle includes main frame components indicated at 8, 9, 10, 11 and 12. The framing provides for support of an engine as indicated at 13, a rider's seat 14 and a fuel tank 15.

The front wheel is indicated at 16 and the rear wheel at 17, these wheels being mounted on the frame structure, only portions of which are shown. The front wheel may be carried in any known manner, as by the fork 18 embodying shock absorbers 19 supported in a steering head 20 which is connected with the frame elements 8 and 10. The usual cycle steering handles 21 may be provided. The engine 13 and other equipment is positioned in the space defined by the frame elements 8, 9 and 10.

The suspension system for the rear or driving wheel 17 includes a swing arm 22 of a type commonly employed on motorcycles and comprising a forked structure embracing the rear wheel 17, as is clearly shown in FIG. 6. Commonly, the swing arm has heretofore been pivotally mounted at some point on the frame structure, usually to the rear of the engine; but in accordance with the present invention, the swing arm is arranged in a novel manner fully described hereinafter.

The drive system for the rear wheel 17 includes a sprocket 23 mounted on the engine shaft and a sprocket 24 mounted on the wheel 17, with a drive chain 25 engaging the engine and wheel sprockets, as clearly appears in the drawings.

For the purpose of eliminating change in the length of the path of the drive chain 25, it is desirable that the motion of the swing arm 22 occur about the center 26 of the engine sprocket 23. However, the direct pivotal mounting of the swing arm 22 on the shaft or axis 26 is not practical because of interference with other parts and the undesired complexity of having the swing arm connected with the engine drive shaft, thereby interfering with separate mounting and removal of the engine and of other parts.

With the foregoing in mind, the invention provides a suspension system which achieves the objective of providing for pivotal motion of the swing arm 22 about the axis of the engine or drive sprocket shaft 26; but this is accomplished without the complexity of direct pivotal mounting of the swing arm on the axis 26. In accordance with the invention, a suspension linkage system is provided which incorporates, in effect, a parallelogram linkage which provides an effective pivotal axis for the swing arm which is coincident with the axis of the sprocket 23, which latter is also customarily coincident with the engine shaft.

The structure provided for the above purpose includes a pair of levers 27 and 28 which are pivotally mounted on axes 29 and 30, carried by mounting brackets secured to the motorcycle framing, one offset above and the other offset below the sprocket shaft 26. These two levers lie in offset vertical planes and extend in a direction toward the drive wheel 17. The free ends of these levers are interconnected by a linkage system including a shaft 31, having at one end, an upwardly extended arm 32, and at the other end, a downwardly extended arm 33.

The swing arm 22 is mounted on the shaft 31; and the lower pivoted arm 28 has an extension 28a with which a link 34 is pivoted, the link 34 being extended upwardly for pivotal attachment to the swing arm 22 at the pivot point 35.

The link parts 31, 33, 28a, 34, and the swing arm 22 itself, constitute a parallelogram linkage which, because of its suspension by means of arms 27 and 28, provides an effective axis of swing motion for the swing arm 22, which axis is coincident with the sprocket shaft 26. It will be noted that this parallelogram linkage, providing the desired center of swing motion for the swing arm and thus for the drive wheel 17, is arranged in a manner to concentrate the parts close to the effective swing motion axis for the swing arm, thereby minimizing inertia effects on the deflection of the wheel itself.

It is also preferred in accordance with the present invention that the shock absorber mechanism, preferably including both a spring and hydraulic damper, be arranged to react on the linkage above described, rather than at an outboard point on the swing arm itself. Thus, the mechanism for yieldably resisting upward deflection of the drive wheel includes a shock absorber mechanism comprising a spring and hydraulic damper unit generally indicated at 36, this unit or assembly being compressible between the end abutment elements 37 and 38. In the embodiment shown, the lower terminal element 37 extends downwardly through an aperture 22a in the swing arm 22 and is pivotally connected at 28b with the arm extension 28a; and the upper terminal element 38 is pivotally connected with one arm 39 of a bellcrank pivoted on the frame of the motorcycle at 40 and having another arm 41 pivotally connected by means of link 42 with the pivot axis 43 which serves also to interconnect the linkage parts 27 and 32.

Figure 2:
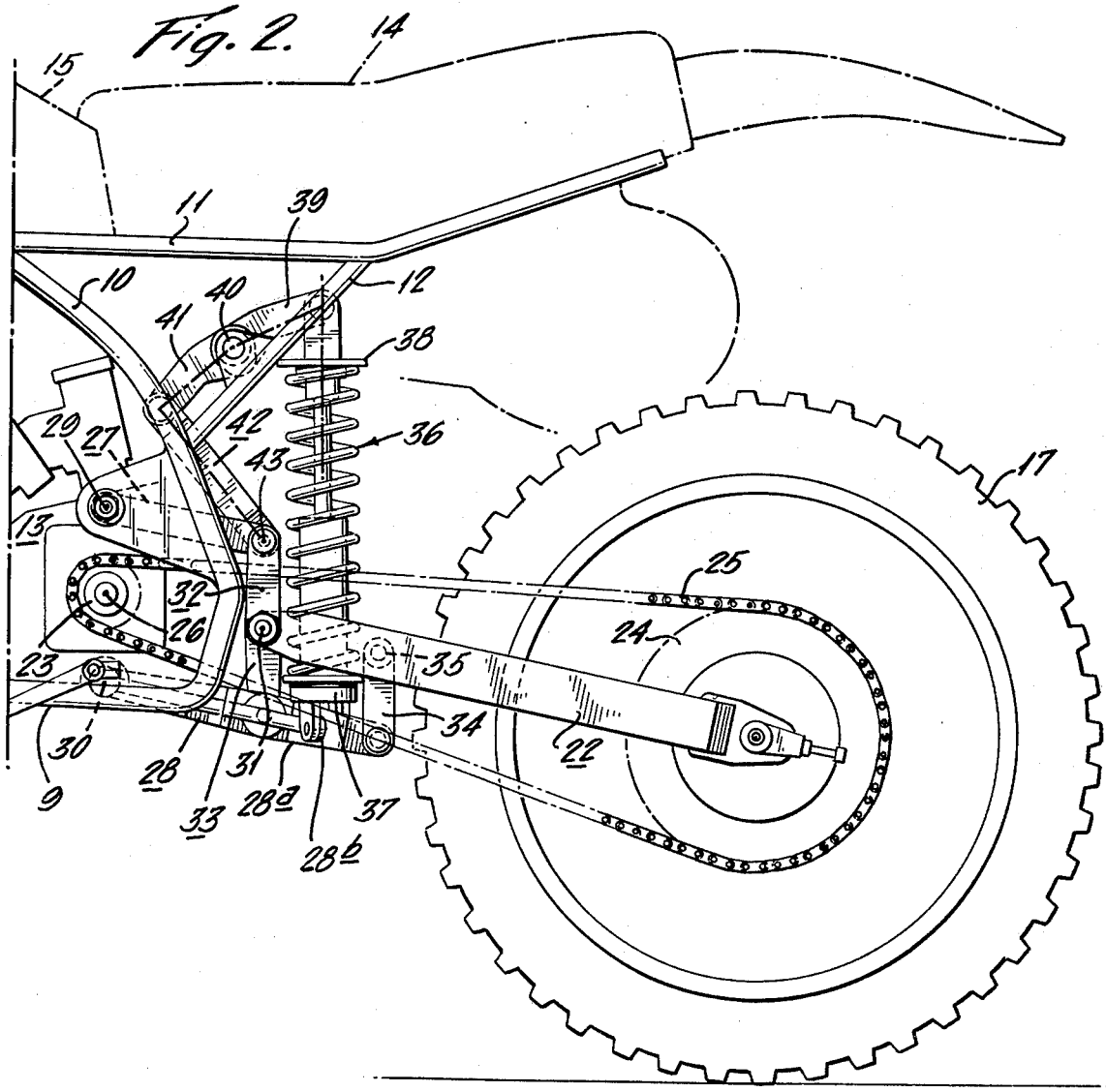
FIG. 2 is an enlarged view of the rear portion of the motorcycle including the driving wheel, with the wheel positioned in the normal or static load supporting position.
Figure 3:
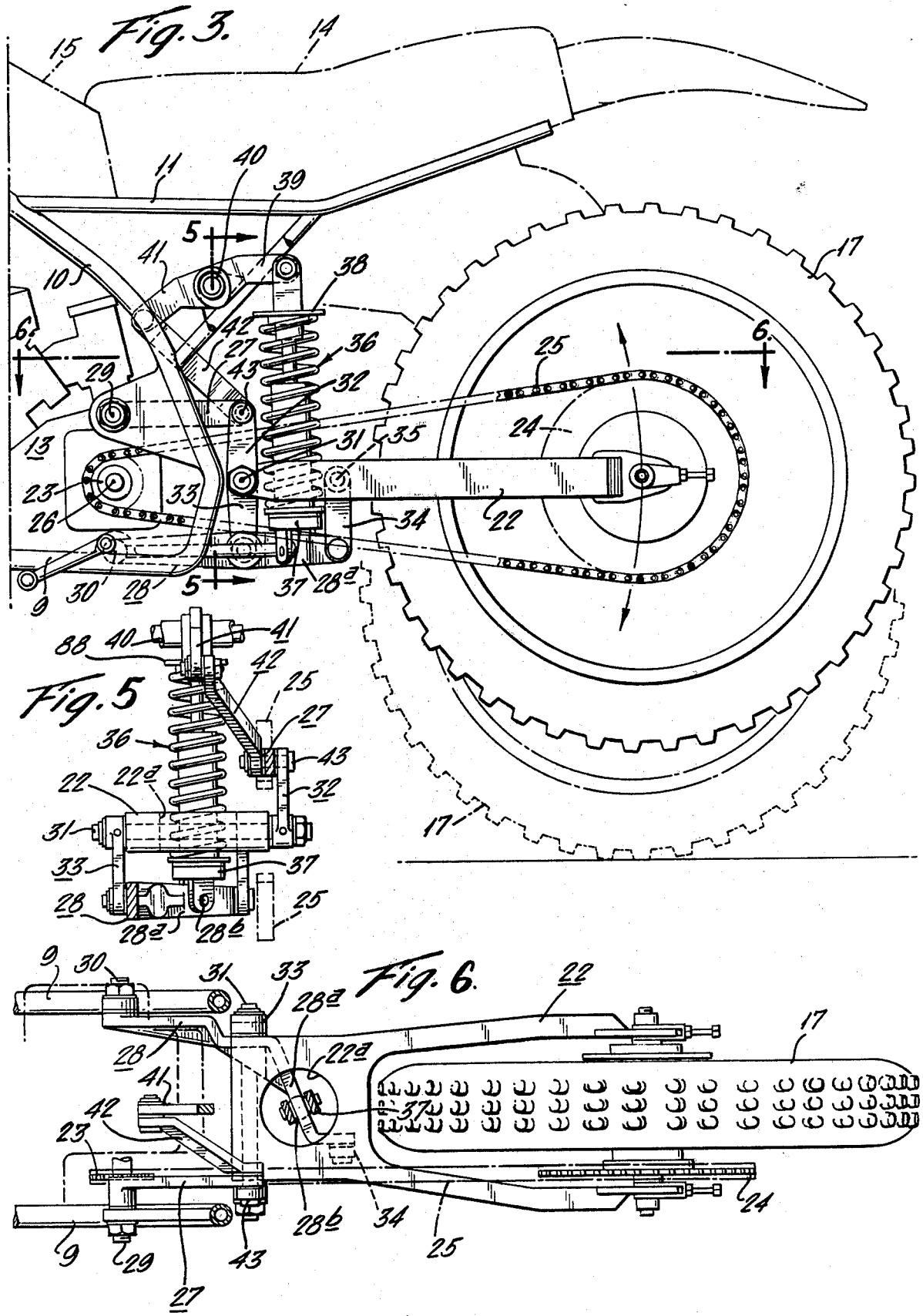
FIG. 3 is a view similar to FIG. 2 but illustrating the wheel in partially deflected position.
Figure 4:
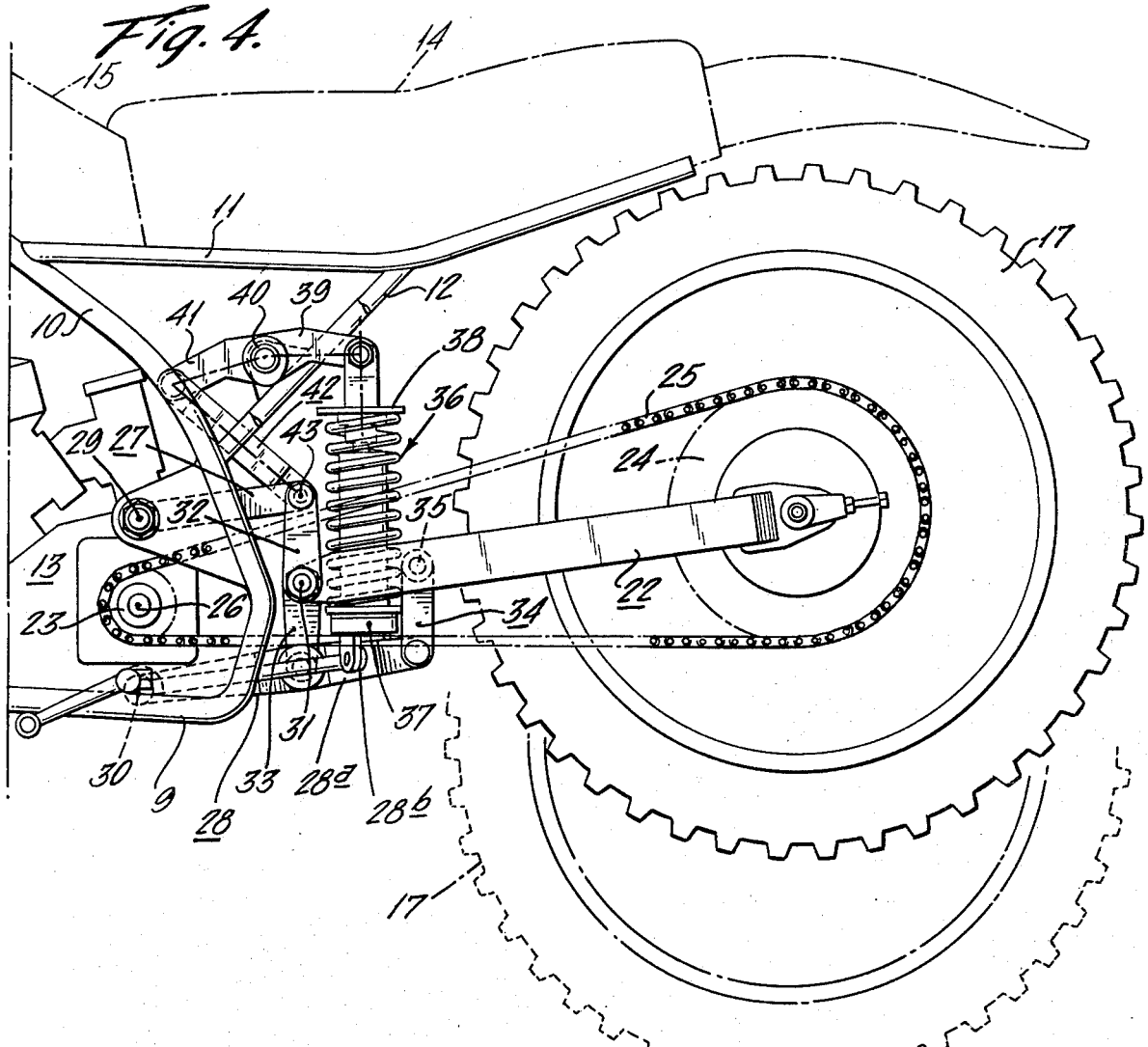
FIG. 4 is a view similar to FIGS. 2 and 3 but illustrating the wheel in an upper deflected position near the top of the stroke.
Figure 7:
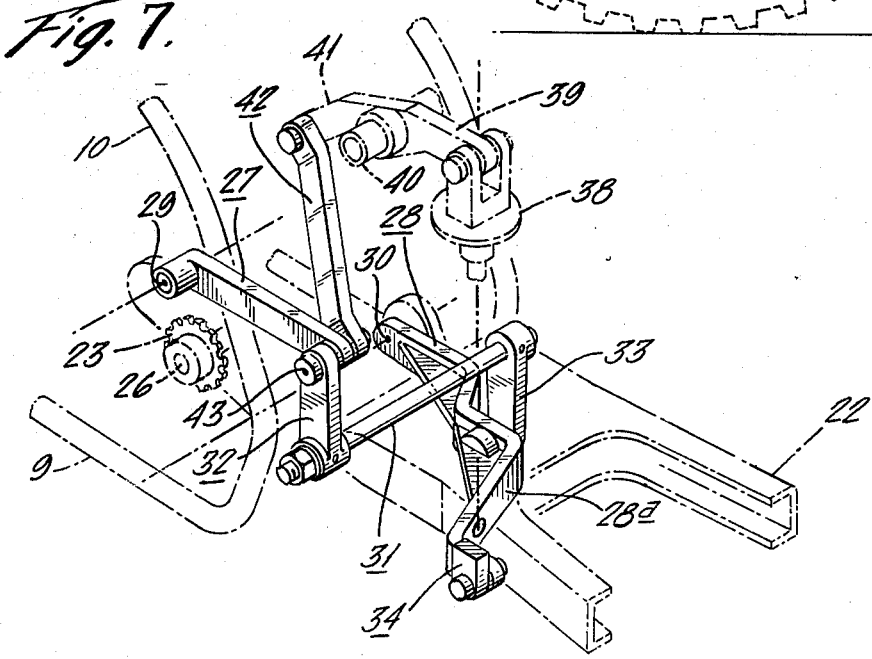
FIG. 7 is a perspective view of some of the linkage parts associated with the swing arm, these parts being arranged in the manner provided by the present invention.

For reasons more fully explained in my copending application Ser. Nos. 351,630 and 269,322 above fully identified, the linkage associated with the shock strut, including the bellcrank having arms 39 and 41, is arranged so that in the static or normal load position, as represented by FIG. 2, the axis of the link 42 is positioned to react in the tangent position in relation to the motion of the arm 41 about the bellcrank pivot 40, as is indicated by the dot and dash lines applied to FIG. 2. Similarly, in the position of maximum deflection, the axis of the shock absorber 36 is positioned to react at the point of tangency of the connection point between the shock absorber and the arm 39 of the bellcrank, as is indicated by dot and dash axis lines as applied to FIG. 4. For reasons fully brought out in my copending applications above identified, the relationships provide a desirable progressive increase in the resistance to deflection of the wheel as the deflection progresses from the static or normal load position represented by FIG. 2 to the maximum load position represented by FIG. 4.

The arrangement of the linkage for the swing arm and for the shock resisting mechanism not only minimizes the inertia effects of these parts in relation to the motion or deflection of the driving wheel, but still further, the disposition of these various parts is important from the standpoint of concentrating those parts close to the center of gravity of the motorcycle as a whole. Moreover, the geometry of the parts as described has special advantages in minimizing tendency for the deflection resisting forces to induce or contribute to undesirable motions of the motorcycle about its overall center of gravity.

The arrangement of the present invention is characterized by the fact that the driving wheel is, in effect, more isolated from the remainder of the motorcycle, particularly with regard to the motions of the drive wheel and the dynamic and inertia forces involved in such motions and also in the action of the shock absorber or other motion resisting mechanism.

Still further, the linkage parts involved in the arrangement of the present invention may be accommodated in a smaller lateral or transverse space than is the case with certain other suspension mechanisms of the prior art. Because of this, notwithstanding the fact that the linkage provides a parallelogram effect causing the motion of the drive wheel to occur about the axis of the driving sprocket, the relatively small overall lateral dimension of the parts provides ground clearance at the two sides of the motorcycle even when making sharp turns, which ground clearance is greater than in many prior suspension arrangements. Because of this increased lateral ground clearance, various parts, especially the suspension parts, may be mounted in lower positions, with consequent lowering of the overall center of gravity of the motorcycle; and this is of advantage for reasons well understood in this art.

I claim:

1. In a motorcycle having a frame, a drive wheel, a motor, and wheel drive mechanism including a motor sprocket, a wheel sprocket, and a drive chain connecting the sprockets, a drive wheel suspension system comprising first and second levers pivotally mounted on fixed axes respectively spaced, one above and the other below the axis of the motor sprocket, first linkage pivotally interconnecting said levers on axes spaced to provide a first parallelogram linkage, a swing arm for the drive wheel pivotally connected with said first linkage on an axis between the axes of pivotal interconnection of said first linkage with the levers, one of said levers having an extension beyond the first linkage, a swing arm link pivotally interconnecting the swing arm and said extension and forming a second parallelogram linkage with said first linkage, the swing arm and said lever extension, and a shock absorber connected with the wheel suspension system for resisting drive wheel deflection.

2. A construction as defined in claim 1 in which the shock absorber includes a shock strut connected with said second parallelogram linkage.

3. A construction as defined in claim 1 and further including a bellcrank pivoted to the motorcycle, and linkage connecting one end of said bellcrank with said first parallelogram linkage, the shock absorber having one end connected with the other end of said bellcrank and having its other end connected with said second parallelogram linkage.

4. In a motorcycle having a frame, a drive wheel, a motor, and wheel drive mechanism including a motor sprocket, a wheel sprocket, and a drive chain connecting the sprockets, a drive wheel suspension system comprising first and second levers pivotally mounted on fixed axes spaced, respectively, one above and the other below the axis of the motor sprocket, the levers being extended from said axes toward the drive wheel, first linkage positioned between the engine sprocket and the wheel and pivotally interconnecting said levers on axes positioned to maintain said levers in substantially parallel relation, a swing arm for the drive wheel pivotally connected with said first linkage on an axis intermediate the axes of pivotal interconnection of said linkage with the levers, second linkage pivotally connecting the swing arm with at least one of said levers and maintaining said swing arm in generally parallel relation to said one lever, and means connected with the wheel suspension system for resisting drive wheel deflection.

5. A construction as defined in claim 4 in which the means for resisting wheel deflection includes a bellcrank pivotally mounted on the motorcycle above said levers and swing arm, a link connecting one arm of the bellcrank with one of said levers, and motion resisting means connected to react between the other arm of the bellcrank and the swing arm.

6. A construction as defined in claim 4 in which the pivot axes of the levers, first linkage and swing arm, and of the second linkage, are all arranged to establish pivotal motion of the drive wheel and swing arm about the axis of the motor sprocket.

7. In a motorcycle having a frame, a drive wheel, a motor and wheel drive mechanism including a motor sprocket, a wheel sprocket, and a drive chain connecting the sprockets, a drive wheel suspension system comprising first and second levers pivotally mounted on fixed axes spaced, respectively, one above and the other below the axis of the motor sprocket, the levers lying in spaced parallel planes and being extended from said axes toward the drive wheel, link mechanism interconnecting said levers and including a shaft extended transversely of said parallel planes in a position intermediate the levers and further including link elements connected with said shaft and extended therefrom for pivotal connection with said levers, a swing arm for the drive wheel connected with said shaft, one of said levers having an extension beyond its connected link element, a swing arm link pivotally interconnecting the swing arm and said extension and forming a parallelogram linkage with said swing arm, said first link and said arm extension, and means connected with the wheel suspension system for resisting drive wheel deflection.

* * * * *